US010887378B2

(12) United States Patent
DeCusatis et al.

(10) Patent No.: US 10,887,378 B2
(45) Date of Patent: *Jan. 5, 2021

(54) SOFTWARE-DEFINED NETWORKING SINGLE-SOURCE ENTERPRISE WORKLOAD MANAGER

(71) Applicant: International Business Machines Corporation, Armonk, NY (US)

(72) Inventors: Casimer M. DeCusatis, Poughkeepsie, NY (US); Rajaram B. Krishnamurthy, Pleasant Valley, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/559,848

(22) Filed: Sep. 4, 2019

(65) Prior Publication Data

US 2019/0394261 A1    Dec. 26, 2019

Related U.S. Application Data

(63) Continuation of application No. 16/285,747, filed on Feb. 26, 2019, now Pat. No. 10,498,805, which is a
(Continued)

(51) Int. Cl.
*H04L 29/08* (2006.01)
*H04L 12/911* (2013.01)
(Continued)

(52) U.S. Cl.
CPC ...... *H04L 67/1002* (2013.01); *H04L 41/0893* (2013.01); *H04L 41/0896* (2013.01);
(Continued)

(58) Field of Classification Search
USPC ........................................................ 709/226
See application file for complete search history.

(56) References Cited

U.S. PATENT DOCUMENTS

2004/0098458 A1* 5/2004 Husain .................. H04L 67/325
709/204
2009/0232027 A1* 9/2009 Rajan ..................... H04L 41/12
370/254
(Continued)

FOREIGN PATENT DOCUMENTS

JP          2011197866        10/2011

OTHER PUBLICATIONS

"Software-Defined Networking: The New Norm for Networks," Open Networking Foundation White Paper Apr. 13, 2012, 12 pages.
(Continued)

*Primary Examiner* — Hermon Asres
(74) *Attorney, Agent, or Firm* — Cantor Colburn LLP; Steven Chiu

(57) ABSTRACT

Embodiments relate to a software-defined networking (SDN) single-source enterprise workload manager. An aspect includes analyzing, by an enterprise server executing a workload compiler, a plurality of source code files of a workload during a workload compilation and build process to determine enterprise network connections between a plurality of subprograms of the workload as a plurality of compile-time information of the workload. The workload compiler generates a network flow graph as interactions between the subprograms of the workload in the enterprise network responsive to the compile-time information of the workload. The network flow graph is provided to an SDN controller to make network resource allocations for the workload based on the network flow graph. A workload manager of the enterprise server adjusts an allocation of compute resources based on a notification of a reallocation of network resources made by the SDN controller.

20 Claims, 6 Drawing Sheets

Related U.S. Application Data continuation of application No. 15/411,269, filed on Jan. 20, 2017, now Pat. No. 10,244,045, which is a continuation of application No. 14/501,198, filed on Sep. 30, 2014, now Pat. No. 9,621,478, which is a continuation of application No. 14/101,393, filed on Dec. 10, 2013, now Pat. No. 9,608,932.

(51) Int. Cl.
*H04L 12/927* (2013.01)
*H04L 12/24* (2006.01)
*H04L 12/26* (2006.01)
*H04L 12/917* (2013.01)
*H04L 12/751* (2013.01)
*H04L 12/715* (2013.01)
*H04L 12/851* (2013.01)

(52) U.S. Cl.
CPC .......... *H04L 41/5054* (2013.01); *H04L 43/08* (2013.01); *H04L 45/02* (2013.01); *H04L 45/64* (2013.01); *H04L 47/2425* (2013.01); *H04L 47/70* (2013.01); *H04L 47/76* (2013.01); *H04L 47/781* (2013.01); *H04L 47/803* (2013.01); *H04L 47/805* (2013.01); *H04L 67/10* (2013.01); *H04L 41/5025* (2013.01); *H04L 43/087* (2013.01); *H04L 43/0858* (2013.01)

(56) References Cited

U.S. PATENT DOCUMENTS

| | | | |
|---|---|---|---|
| 2010/0061249 A1* | 3/2010 | Rius i Riu | H04L 41/5032 370/242 |
| 2012/0324527 A1 | 12/2012 | Brown et al. | |
| 2013/0028091 A1 | 1/2013 | Sun et al. | |
| 2013/0060738 A1* | 3/2013 | Koponen | H04L 41/0816 707/640 |
| 2013/0250770 A1* | 9/2013 | Zou | H04L 41/12 370/238 |
| 2013/0329601 A1* | 12/2013 | Yin | H04L 45/34 370/254 |

OTHER PUBLICATIONS

A. Tootoonchian, et al., "On Controller Performance in Software-Defined Networks," Hot-ICE'12: Proceedings of the 2nd USENIX conference on Hot Topics in Management of Internet, Cloud, and Enterprise Networks and Services, Apr. 2012, 6 pages.

Ikenaga, et al., Implementation of Virtual Organization based Network Management System for High Performance Grid Network, IEICE Technical Report, vol. 103, No. 692, Feb. 27, 2004, pp. 367-372.

International Application No. PCT/JP2014/004790 International Search Report and Written Opinion dated Dec. 22, 2014, 9 pages—ISR/WO—dated Dec. 22, 2014.

J. Metzler, et al., "The 2011 Cloud Networking Report," CA Technologies, Producted by: Webtorials, Dec. 2011, 111 pages.

R. Cannistra, et al., "Software Defined Networking with OpenFlow," MARIST School of Computing Technology and Mathematics, Internet2 Technology in Paradise 2013 Joint Conference, Honolulu, HI, Jan. 2013, 40 pages.

R. Recio, "Software Defined Networking Disruptive Technologies," IBM Fellow & Systems Networking CTO, Nov. 2012 IBM Corporation, 27 pages.

Takefusa, et al., GridARS: A Grid Advanced Resource Management System Framework for Intercloud, Cloud Computing Technology and Science (CloudCom), 2011 IEEE Third International Conference on, IEEE, Nov. 29, 2011, pp. 705-710.

Watashiba, et al., A Proposal of Network-aware Job Management System leveraging SDN, IPSJ SIG Technical Report, Feb. 15, 2013, 1 page.

\* cited by examiner

SOFTWARE-DEFINED NETWORKING SINGLE-SOURCE ENTERPRISE WORKLOAD MANAGER

DOMESTIC PRIORITY

The present application is a continuation of U.S. application Ser. No. 16/285,747 filed Feb. 16, 2019, which is a Continuation of U.S. application Ser. No. 15/411,269 filed Jan. 20, 2017, now U.S. Pat. No. 10,244,045, which is a Continuation of U.S. application Ser. No. 14/501,198 filed Sep. 30, 2014, now U.S. Pat. No. 9,621,478, which is a Continuation of U.S. application Ser. No. 14/101,393 filed Dec. 10, 2013, now U.S. Pat. No. 9,608,932, the contents of which are hereby incorporated by reference in its entirety.

BACKGROUND

The present invention relates generally to software-defined networking, and more specifically, to a software-defined networking single-source enterprise workload manager.

An enterprise network is typically built and managed by an organization to interconnect a number of computing resources at various locations. In traditional enterprise network architectures, there is no centralized network control. Routing tables located locally in network devices, such as switches, bridges, gateways, routers, or firewalls, are individually configured to direct network traffic to neighboring nodes of the network. The network devices may make control decisions and forward network traffic accordingly.

In software-defined networking (SDN), network traffic routing decisions are made by a controller that creates tables to define flow paths through the network. The controller decouples control decisions about where traffic is sent from network devices that forward traffic to a selected destination. Tables used to manage flows in SDN are typically manually created and managed by a person acting as a network administrator. An enterprise network may include a large number of flows between many computing resources. As the number of flows increases, the burden of setting up and effectively managing the flows can become overwhelming for the network administrator, making SDN challenging to implement and maintain at an enterprise level.

SUMMARY

An aspect includes a computer-implemented method for software-defined networking (SDN) single-source enterprise workload management. The method includes analyzing, by an enterprise server executing a workload compiler, a plurality of source code files of a workload during a workload compilation and build process to determine enterprise network connections between a plurality of subprograms of the workload as a plurality of compile-time information of the workload. The workload includes a distributed application formed from the subprograms executing on a plurality of servers distributed across the enterprise network to implement portions of the distributed application. The workload compiler generates a network flow graph as interactions between the subprograms of the workload in the enterprise network responsive to the compile-time information of the workload. The network flow graph is provided to an SDN controller to make network resource allocations for the workload based on the network flow graph. A workload manager of the enterprise server adjusts an allocation of compute resources based on a notification of a reallocation of network resources made by the SDN controller. The reallocation of network resources can be performed predictively at an anticipated peak demand time based on one or more observed patterns in a plurality of network traffic performance metrics.

A further aspect is system for SDN single-source enterprise workload management. The system includes an SDN controller in an enterprise network and an enterprise server. The enterprise server includes a workload compiler and a workload manager. The enterprise server is configured to perform a method that includes analyzing, by the workload compiler, a plurality of source code files of a workload during a workload compilation and build process to determine enterprise network connections between a plurality of subprograms of the workload as a plurality of compile-time information of the workload. The workload includes a distributed application formed from the subprograms executing on a plurality of servers distributed across the enterprise network to implement portions of the distributed application. The workload compiler generates a network flow graph as interactions between the subprograms of the workload in the enterprise network responsive to the compile-time information of the workload. The network flow graph is provided to the SDN controller to make network resource allocations for the workload based on the network flow graph. The workload manager adjusts an allocation of compute resources based on a notification of a reallocation of network resources made by the SDN controller. The reallocation of network resources can be performed predictively at an anticipated peak demand time based on one or more observed patterns in a plurality of network traffic performance metrics.

Another aspect is a computer program product for SDN single-source enterprise workload management. The computer program product includes a storage medium readable by a processing circuit and storing instructions for execution by the processing circuit for performing a method. The method includes analyzing, by an enterprise server executing a workload compiler, a plurality of source code files of a workload during a workload compilation and build process to determine enterprise network connections between a plurality of subprograms of the workload as a plurality of compile-time information of the workload. The workload includes a distributed application formed from the subprograms executing on a plurality of servers distributed across the enterprise network to implement portions of the distributed application. The workload compiler generates a network flow graph as interactions between the subprograms of the workload in the enterprise network responsive to the compile-time information of the workload. The network flow graph is provided to an SDN controller to make network resource allocations for the workload based on the network flow graph. A workload manager of the enterprise server adjusts an allocation of compute resources based on a notification of a reallocation of network resources made by the SDN controller. The reallocation of network resources can be performed predictively at an anticipated peak demand time based on one or more observed patterns in a plurality of network traffic performance metrics.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Exemplary embodiments include a system for managing and controlling application-aware network traffic flows in an enterprise network in which several applications are running on servers in the enterprise network at substantially the same time. The network traffic may be in the form of packets with headers identifying source, destination, and protocol information. An application running in the enterprise network is referred to as a workload or enterprise workload and may involve a number of subprograms distributed at various servers in the enterprise network. The servers and network resources, such as switches, may be referred to generally as nodes of the network, where network traffic is routed through a number of intermediate nodes between network endpoints forming a flow or flow path. The system provides visibility of network traffic flows to software-defined networking (SDN) control logic, which is a program executed in an SDN controller that allocates bandwidth and resources. The SDN controller can also establish priority on a per-workload basis based on flow classification. Header information in network traffic can be used to classify flows based on source, destination, protocol, and other such information.

In exemplary embodiments, a workload compiler of an enterprise server identifies interactions between various distributed subprograms when compiling source code files for a workload. The interactions may be captured in a network flow graph which can also include constraints defined as quality-of-service requirements in the network flow graph on an end-to-end and per-link basis according to a service level agreement. The network flow graph is provided to the SDN controller, which interprets the interactions between distributed sub-programs of the workload as prompts for network resource allocation. The SDN controller recognizes the prompts and automatically generates flow management and control data among the nodes in the enterprise network. Traffic profiling at the network endpoints (e.g., server channel adapters) and intermediate nodes (e.g., switches) can be used to determine network traffic performance metrics, which are returned to the SDN controller. The SDN controller can use feedback iterations to optimize and remap traffic flows based on the network traffic performance metrics indicative of evolving quality-of-service requirements (e.g., data volume, bandwidth, delay, jitter, etc.).

Figure 1:
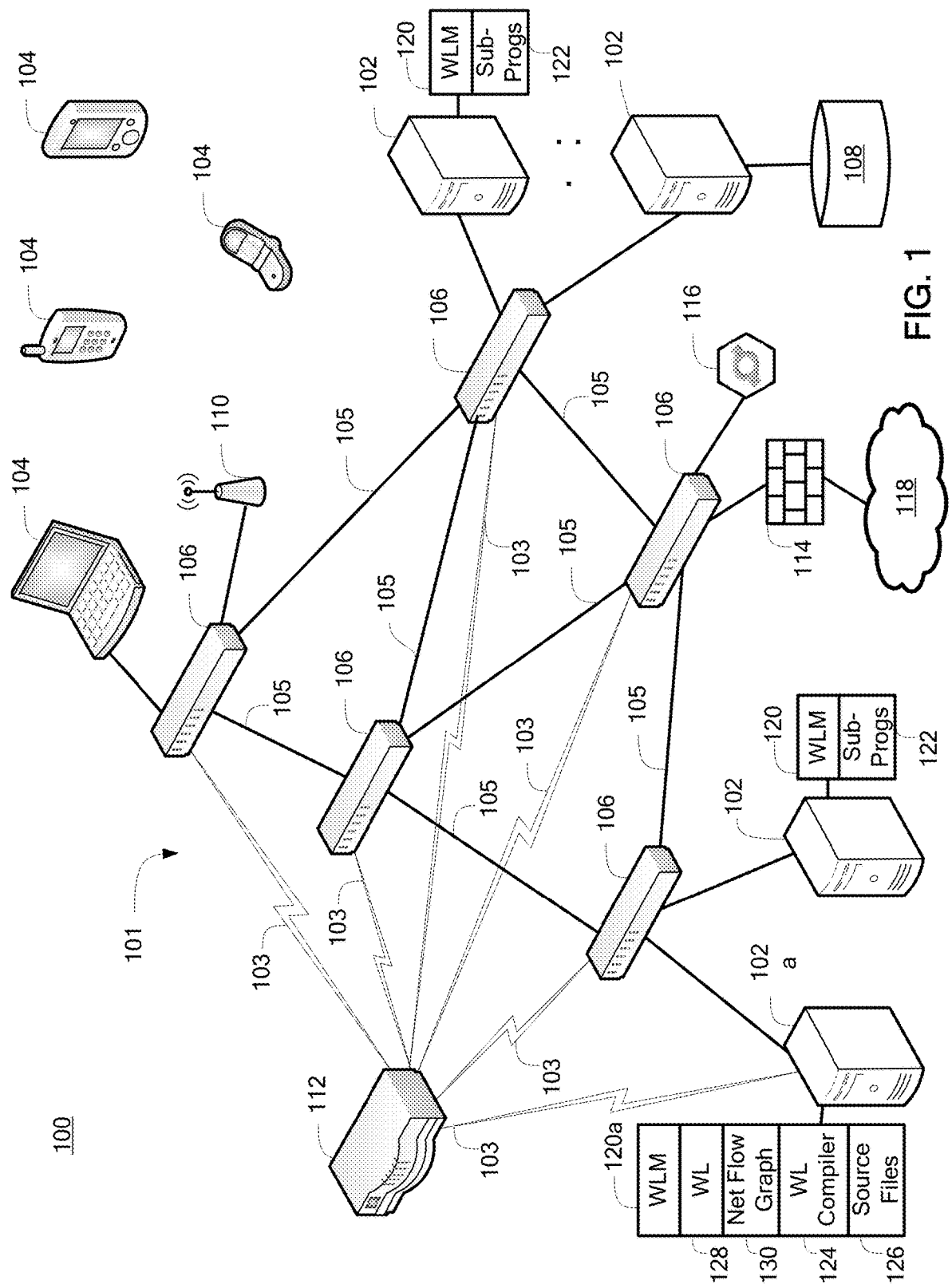
FIG. 1 depicts a system including a software-defined networking (SDN) single-source enterprise workload manager in accordance with an embodiment.

Turning now to FIG. 1, an example of a system 100 including a network 101 that supports software-defined networking (SDN) will now be described in greater detail. In the example depicted in FIG. 1, the system 100 is an enterprise system including a plurality of servers 102 and client systems 104 configured to communicate over the network 101 using switches 106 that are SDN-capable, e.g., OpenFlow-compatible. Accordingly, the network 101 may also be referred to as enterprise network 101 and can be geographically distributed between multiple physical locations. In exemplary embodiments, the servers 102, also referred as hosts or host systems, are high-speed processing devices (e.g., mainframe computers, desktop computers, laptop computers, hand-held devices, embedded computing devices, or the like) including at least one processing circuit (e.g., a computer processor/CPU) capable of reading and executing instructions, and handling interactions with various components of the system 100. One or more of the servers 102 may be storage system servers configured to access and store large amounts of data to one or more data storage systems 108. The servers 102 may also be compute nodes that include one or more workload managers 120, subprograms 122, and other applications (not depicted).

The client systems 104 can include a variety of desktop, laptop, general-purpose computer devices, mobile computing devices, and/or networked devices with processing circuits and input/output (I/O) interfaces, such as keys/buttons, a touch screen, audio input, a display device and audio output. The client systems 104 can be linked directly to one or more of the switches 106 or wirelessly through one or more wireless access points 110.

The data storage systems 108 refer to any type of computer readable storage media and may comprise one or more secondary storage elements, e.g., hard disk drive (HDD), solid-state memory, tape, or a storage subsystem that is internal or external to the servers 102. Types of data that may be stored in the data storage systems 108 include, for example, various files and databases. There may be multiple data storage systems 108 utilized by one or more of the servers 102, which can be distributed in various locations of the system 100.

The system 100 also includes an SDN controller 112 that is a central software-defined network controller configured to make routing decisions within the network 101. The SDN controller 112 establishes secure links 103 to configure the switches 106 and communication properties of links 105 between the switches 106. For example, the SDN controller 112 can configure the switches 106 to control packet routing paths for data flows between the servers 102 and client systems 104, as well as one or more firewalls 114 and one or more load balancers 116. The one or more firewalls 114 restrict access and the flow of network traffic between the network 101 and one or more external networks 118. The one or more load balancers 116 can distribute workloads across multiple computers, such as between the servers 102. The SDN controller 112 can also configure the switches 106 to define flows between the servers 102, programs (e.g., virtual machines), and subprograms 122 running on the servers 102.

The servers 102, client systems 104, and SDN controller 112 can include various computer/communication hardware and software technology known in the art, such as one or more processing units or circuits, volatile and non-volatile memory including removable media, power supplies, network interfaces, support circuitry, operating systems, and the like. Although the SDN controller 112 is depicted as a separate component, it will be understood that network configuration functionality can alternatively be implemented in one or more of the servers 102 or client systems 104 in a standalone or distributed format.

The network 101 can include a combination of wireless, wired, and/or fiber optic links. The network 101 as depicted in FIG. 1 represents a simplified example for purposes of explanation. For example, each of the links 105 depicted in the network 101 can include more than one physical link. Embodiments of the network 101 can include numerous switches 106 (e.g., hundreds) with dozens of ports and links per switch 106. The switches 106 are also referred to generally as network resources and may represent any type of device that is capable of forwarding data through one or more ports. The network 101 may support a variety of known communication standards that allow data to be transmitted between the servers 102, client systems 104, switches 106, SDN controller 112, firewalls(s) 114, and/or load balancer(s) 116. Communication protocols are typically implemented in one or more layers, such as a physical layer (layer-1), a link layer (layer-2), a network layer (layer-3), a transport layer (layer-4), and an application layer (layer-5). In exemplary embodiments, the network 101 supports SDN as a layer-2 protocol. The switches 106 can be dedicated SDN switches or SDN-enabled general purpose switches that also support layer-2 and layer-3 Ethernet.

In an exemplary embodiment, one of the servers 102 is an enterprise server 102a that is operable to configure the SDN controller 112. In the example of FIG. 1, the enterprise server 102a includes a workload compiler 124 and source code files 126 for a workload 128. The workload compiler 124 can analyze the source code files 126 during a workload compilation and build process to determine network connections between various distributed subprograms 122 of the workload 128. A network flow graph 130 is generated that lists interactions between the various distributed subprograms 122 of the workload 128. A secure link 103 may be used between the enterprise server 102a and the SDN controller 112 to provide the network flow graph 130 to the SDN controller 112. The SDN controller 112 can aggregate and allocate flows and manage the interactions. The network flow graph 130 may also list default quality-of-service requirements, such as end-to-end delay and bandwidth requirements, as well as other requirements on a per-link basis, e.g., jitter. The SDN controller 112 can make initial allocations and provisions based on compile-time information in the network flow graph 130.

The SDN controller 112 can also provide hints about network resource allocation to one or more workload managers 120 at one or more network endpoints to enable the one or more workload managers 120 to allocate compute resources to align with the network resource allocation to meet a service level agreement. The service level agreement (not depicted) can include requirements associated with both network-based quality-of-service requirements and processing resources. Hints from the SDN controller 112 can also be provided to a workload manager 120a of the enterprise server 102a. The workload manager 120a may adjust an allocation of compute resources to align with the network resource allocation to meet the service level agreement based on the hints. The hints can be updated as the SDN controller 112 learns more about the performance of the network 101 over a period of time.

Figure 2:
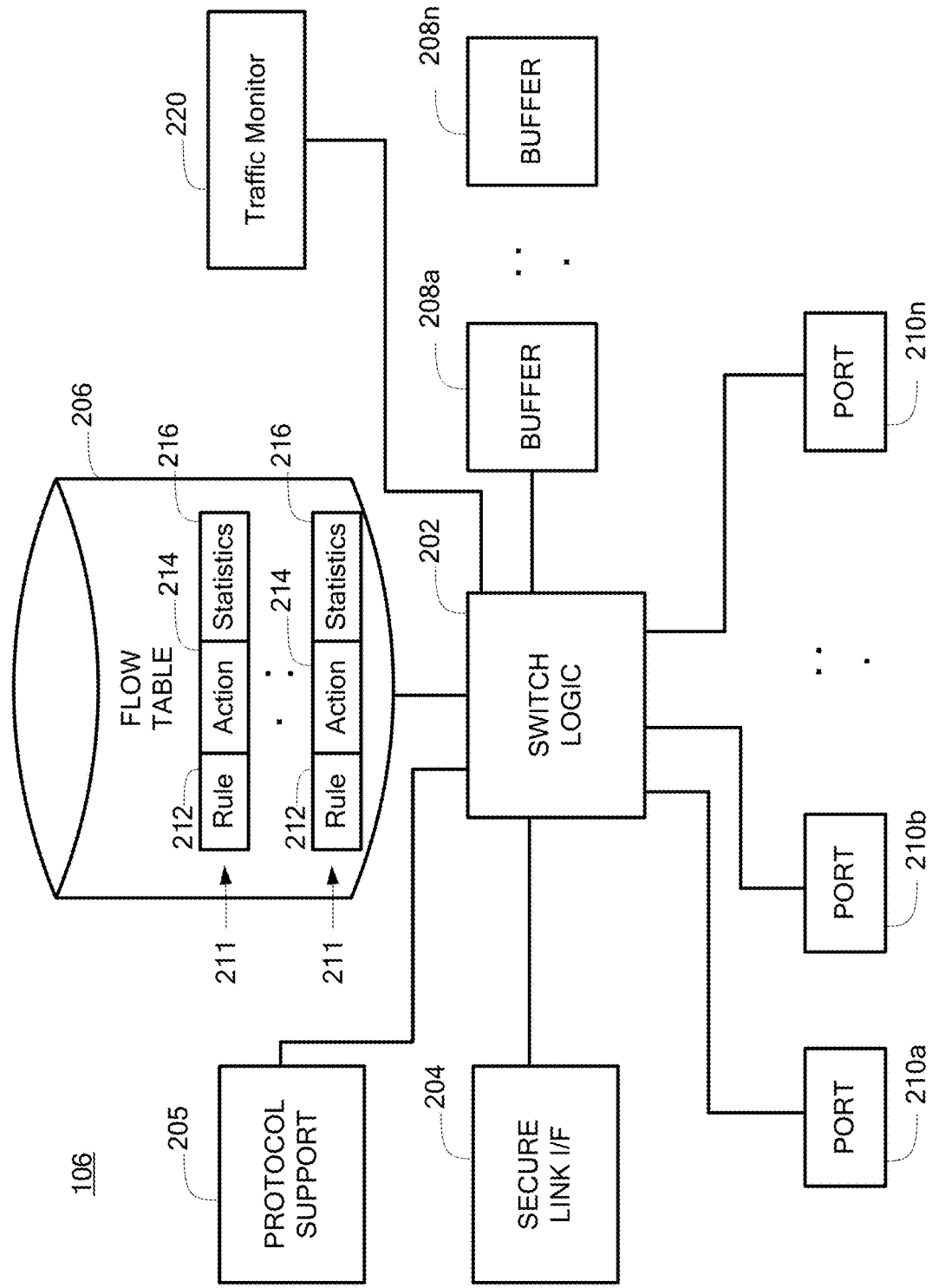
FIG. 2 depicts a block diagram of a switch of the system of FIG. 1 according to an embodiment.

FIG. 2 depicts a block diagram of the switch 106 of FIG. 1 that supports SDN. The switch 106 includes switch logic 202, secure link interface 204, protocol support 205, flow table 206, buffers 208a-208n, and ports 210a-210n. The switch 106 can also include traffic monitor 220 to monitor network traffic locally to determine network traffic performance metrics and provide the network traffic performance metrics to the SDN controller 112 of FIG. 1. The switch logic 202 may be implemented in one or more processing circuits, where a computer readable storage medium is configured to hold instructions for the switch logic 202 and/or the traffic monitor 220, as well as various variables and constants to support operation of the switch 106. The switch logic 202 forwards network traffic (e.g., packets) between the ports 210a-210n as flows defined by the SDN controller 112 of FIG. 1.

The secure link interface 204 connects the switch 106 to the SDN controller 112 via a secure link 103 of FIG. 1. The secure link interface 204 allows commands and packets to be communicated between the SDN controller 112 and the switch 106 using an SDN protocol. The secure link interface 204 can be controlled by executable instructions stored within the switch 106. Protocol details to establish a protocol definition for an implementation of SDN and other protocols can be stored in the protocol support 205. The protocol support 205 may be software that defines one or more supported protocol formats. The protocol support 205 can be embodied in a computer readable storage medium, for instance, flash memory, which is configured to hold instructions for execution by the switch logic 202. Implementing the protocol support 205 as software enables updates in the field for new versions or variations of protocols and can provide SDN as an enhancement to existing conventional routers or switches.

The flow table 206 defines supported connection types associated with particular addresses, virtual local area networks or switch ports, for example. A flow may be defined as all network traffic that matches a particular header format, including use of wildcards. Each entry 211 in the flow table 206 can include one or more rules 212, actions 214, and statistics 216 associated with a particular flow. The rules 212 define each flow and can be determined by packet headers. The actions 214 define how packets are processed. The statistics 216 track information such as the size of each flow (e.g., number of bytes), the number of packets for each flow, and time since the last matching packet of the flow or connection time. Examples of actions include instructions for forwarding packets of a flow to one or more specific ports 210a-210n (e.g., unicast or multicast), encapsulating and forwarding packets of a flow to the SDN controller 112 of FIG. 1, and dropping packets of the flow. Entries 211 in the flow table 206 can be added and removed by the SDN controller 112 of FIG. 1 via the secure link interface 204. The SDN controller 112 of FIG. 1 can pre-populate the entries 211 in the flow table 206. Additionally, the switch 106 can request creation of an entry 211 from the SDN controller 112 upon receiving a flow without a corresponding entry 211 in the flow table 206.

The buffers 208a-208n provide temporary storage in queues for flows as network traffic is sent between the ports 210a-210n. In a lossless configuration, rather than dropping packets of network traffic when network congestion is present, the buffers 208a-208n temporarily store packets until the associated ports 210a-210n and links 105 of FIG. 1 are available. Each of the buffers 208a-208n may be associated with a particular port, flow, or sub-network. Each of the buffers 208a-208n is logically separate but need not be physically independent. Accordingly, when one of the buffers 208a-208n is full, it does not adversely impact the performance of the other buffers 208a-208n within the switch 106.

Figure 3:
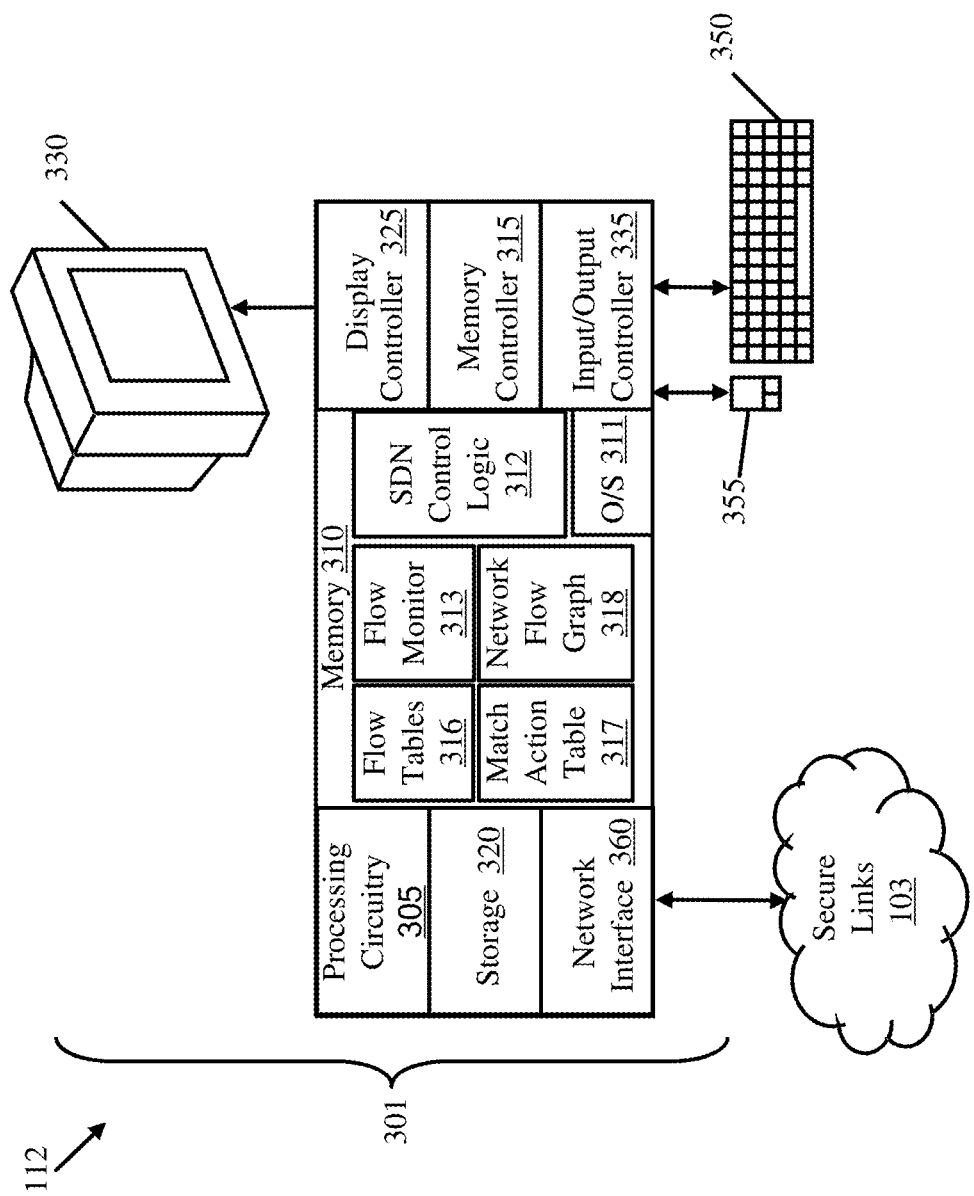
FIG. 3 depicts a block diagram of an SDN controller of the system of FIG. 1 in accordance with an embodiment.

FIG. 3 depicts a block diagram of the SDN controller 112 of FIG. 1 according to an embodiment. The SDN controller 112 can be embodied in any type of processing system and is depicted embodied in a general-purpose computer 301 in FIG. 3. The enterprise server 102a, servers 102, and client systems 104 of FIG. 1 can also include similar computer elements as depicted in the computer 301 of FIG. 3.

In an exemplary embodiment, in terms of hardware architecture, as shown in FIG. 3, the computer 301 includes processing circuitry 305 and memory 310 coupled to a memory controller 315, and an input/output controller 335. The input/output controller 335 can be, for example but not limited to, one or more buses or other wired or wireless connections, as is known in the art. The input/output controller 335 may have additional elements, which are omitted for simplicity, such as controllers, buffers (caches), drivers, repeaters, and receivers, to enable communications. Further, the computer 301 may include address, control, and/or data connections to enable appropriate communications among the aforementioned components.

In an exemplary embodiment, a conventional keyboard 350 and mouse 355 or similar devices can be coupled to the input/output controller 335. Alternatively, input may be received via a touch-sensitive or motion sensitive interface (not depicted). The computer 301 can further include a display controller 325 coupled to a display 330.

The processing circuitry 305 is a hardware device for executing software, particularly software stored in storage 320, such as cache storage, or memory 310. The processing circuitry 305 can be any custom made or commercially available computer processor, a central processing unit (CPU), an auxiliary processor among several processors associated with the computer 301, a semiconductor-based microprocessor (in the form of a microchip or chip set), a macro-processor, or generally any device for executing instructions.

The memory 310 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), tape, compact disc read only memory (CD-ROM), disk, hard disk drive, diskette, cartridge, cassette or the like, etc.). Moreover, the memory 310 may incorporate electronic, magnetic, optical, and/or other types of storage media. Accordingly, the memory 310 is an example of a tangible computer readable storage medium upon which instructions executable by the processing circuitry 305 may be embodied as a computer program product. The memory 310 can have a distributed architecture, where various components are situated remote from one another, but can be accessed by the processing circuitry 305.

The instructions in memory 310 may include one or more separate programs, each of which comprises an ordered listing of executable instructions for implementing logical functions. In the example of FIG. 3, the instructions in the memory 310 include a suitable operating system (OS) 311, SDN control logic 312, and a flow monitor 313. The operating system 311 essentially controls the execution of other computer programs and provides scheduling, input-output control, file and data management, memory management, and communication control and related services. Although depicted separately, the SDN control logic 312 and flow monitor 313 can be combined or further subdivided. When the computer 301 is in operation, the processing circuitry 305 is configured to execute instructions stored within the memory 310, to communicate data to and from the memory 310, and to generally control operations of the computer 301 pursuant to the instructions.

In an exemplary embodiment, the computer 301 can further include a network interface 360 for coupling to the secure links 103 of the network 101 of FIG. 1. The network interface 360 and components of the network 101 of FIG. 1 can be configured by the SDN control logic 312 according to flow tables 316, a match action table 317, and a network flow graph 318. The network flow graph 318 is a local copy of the network flow graph 130 of FIG. 1 that can be further updated as additional characteristics of the network 101 are learned and refined. The network flow graph 318 can be expanded to include currently known characteristics of the network 101 of FIG. 1, such as network resource details of the servers 102, links 105, and switches 106 of FIG. 1. The flow tables 316 can be created based on the network flow graph 318 and the characteristics of the network 101 of FIG. 1. The flow tables 316 can be defined for each of the switches 106 of FIG. 1 and deployed as instances of the flow table 206 of FIG. 2 including mapping to specific ports 210a-210n of FIG. 2. The match action table 317 can be used to define specific conditions for the actions 214 in the flow table 206 of FIG. 2 and link flows across multiple switches 106 of FIG. 1. The match action table 317 may include rules for particular internet protocol (IP) addresses, media access control (MAC) addresses, virtual machine identifiers, and/or workloads, and match associated actions across the flow tables 316.

Upon detecting or receiving network traffic performance metrics from instances of the traffic monitor 220 of FIG. 2, the flow monitor 313 can modify one or more of the flow tables 316, match action table 317, and network flow graph 318 to improve overall performance of the network 101 of FIG. 1. Consider an example where the network 101 represents an enterprise network for a bank and the subprograms 122 FIG. 1 are instances of software to operate automatic teller machines (ATMs) at a variety of locations, and the workload 128 of FIG. 1 is ATM management software at a bank hub. The network flow graph 130 may appear as a hub and spokes with many subprograms 122 of FIG. 1 linking back to the workload 128 of FIG. 1. An initial allocation of flows may equally distribute bandwidth for flows on individual links 105 of FIG. 1, and corresponding instances of the flow tables 316, match action table 317, and network flow graph 318 would be created. Over a period of time, the network traffic performance metrics can reveal greater demands at certain locations (e.g., a busy street corner) and lower demands at other locations (e.g., at a remote/isolated location) as network traffic varies for different instances of the subprograms 122 of FIG. 1. Other variations, for instance, based on time of day, can also be observed. Accordingly, the flow monitor 313 can update the flow tables 316, match action table 317, and network flow graph 318 to reflect differing quality-of-service requirements between flows for various subprograms 122 of FIG. 1. For instance, the match action table 317 may include time-based rules to predictively reallocate network resources at anticipated peak demand times based on observed patterns in the network traffic performance metrics.

As initial assignments and/or changes are made to network resource allocations, the SDN control logic 312 may also inform the workload managers 120 and 120a of FIG. 1 by providing hints as to the quality-of-service provided by the network 101 of FIG. 1. The hints may assist the workload managers 120 and 120a in allocating compute resources to align with the network resource allocation to meet a service level agreement for the system 100 of FIG. 1.

Figure 4:
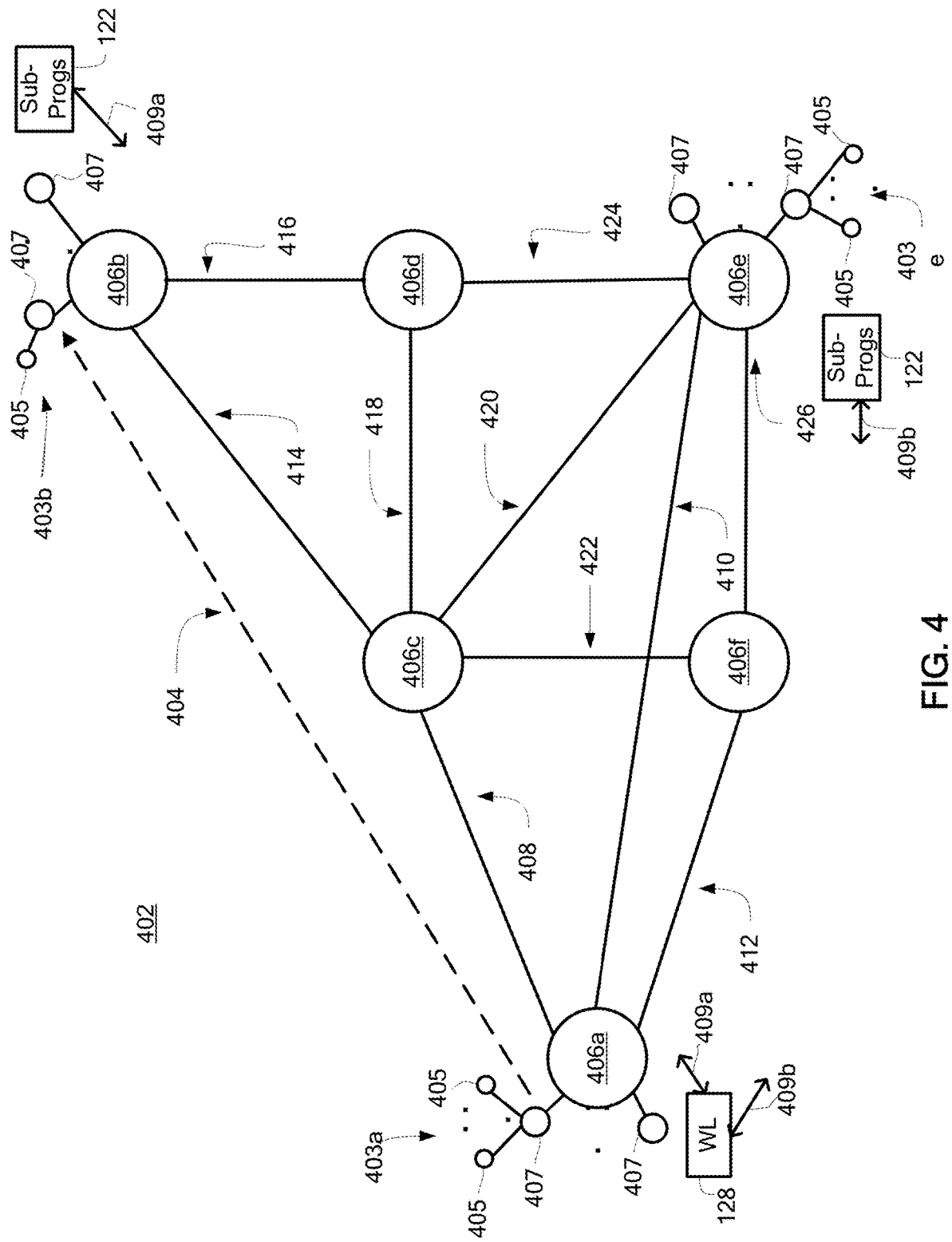
FIG. 4 depicts an example of a network flow graph in accordance with an embodiment.

FIG. 4 depicts an example of a network flow graph 402 in accordance with an embodiment. The network flow graph 402 may be an embodiment of the network flow graph 318 of FIG. 3, as the network flow graph 130 of FIG. 1 may not include this level of detail when populated by the workload compiler 124 of FIG. 1. A flow (also referred to as a path or route) through the network flow graph 402 typically involves a plurality of nodes or switches and edges or links. For example, a flow 404 from a compute node 403a (e.g., enterprise server 102a of FIG. 1) to a compute node 403b (e.g., a server 102 of FIG. 1) passes between switches 406a, 406c, and 406b. In the example network flow graph 402 of FIG. 4, there are six switches 406a-406f, representing network resources such as switches 106 of FIG. 1 but in a different configuration in this example. Switch 406a is coupled to switch 406c by link 408, to switch 406e by link 410, and to switch 406f by link 412. Switch 406b is coupled to switch 406c by link 414 and to switch 406d by link 416. Switch 406c is also coupled to switch 406d by link 418, to switch 406e by link 420, and to switch 406f by link 422. Switch 406d is coupled to switch 406e by link 424, and switch 406e is coupled to switch 406f by link 426. Accordingly, if all of the links and switches are available for routing of network traffic within the network flow graph 402, the flow 404 represents one possible routing path between switches 406a and 406b; however, numerous paths may be available such as switches 406a to 406e to 406c to 406b or switches 406a to 406f to 406e to 406d to 406b, etc.

The example of FIG. 4 depicts interactions 409a and 409b (interactions 409 generally) between workload 128 and subprograms 122. Compute nodes 403b and 403e may be configured to run subprograms, such as subprograms 122 and compute node 403a may be configured to run a workload, such as workload 128. The compute nodes 403a-403e may each be referred to generally as a compute node 403. Each compute node 403 may include a number of network endpoints 407, such as channel adapters. The switches 406a-406f may also be referred to generally as intermediate nodes 406. Each compute node 403 may have a number of compute resources 405, e.g., processors, buffers, and processing routines. The workload managers 120a and 120 of FIG. 1 can control allocation of the compute resources 405 and network endpoints 407 to support a given workload, such as workload 128. The workload managers 120a and 120 of FIG. 1 can assign more network endpoints 407 (e.g., channel adapters) to increase bandwidth. The workload managers 120a and 120 of FIG. 1 can also assign more compute resources 405 (e.g., processing resources) to increase network traffic handling routings and meet a service level agreement based on hints from the SDN controller 112 of FIG. 1. The workload managers 120a and 120 of FIG. 1 may allocate additional buffers at one or more of the compute nodes 403 based on the SDN controller 112 of FIG. 1 determining that jitter requirements are not met by the current allocation. Similarly, for the switches 406a-406f, additional buffers (e.g., buffers 208a-208n of FIG. 2) can be allocated based on the SDN controller 112 of FIG. 1 determining that jitter requirements are not met by the current allocation for a particular link.

Figure 5:
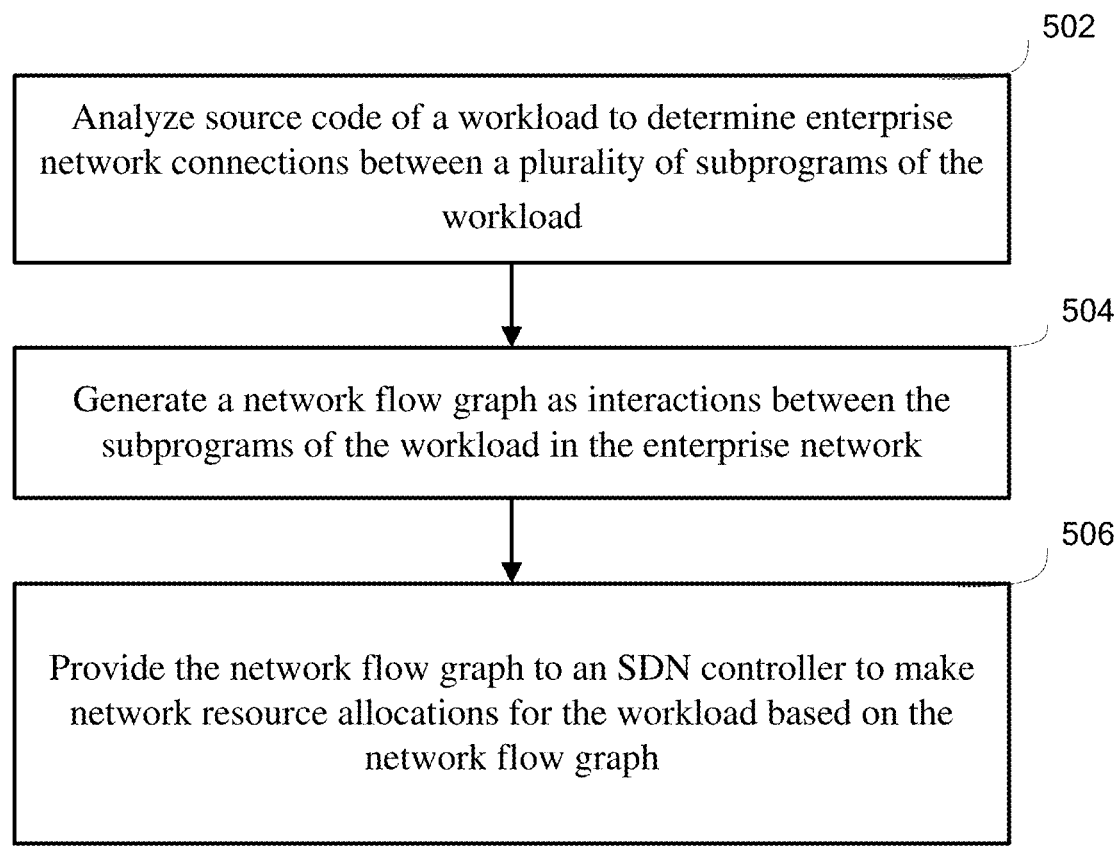
FIG. 5 depicts a process flow for a workload compiler to support SDN single-source enterprise workload management in accordance with an embodiment.

FIG. 5 depicts a process 500 for a workload compiler to support SDN single-source enterprise workload management as a computer-implemented method in accordance with an embodiment. The process 500 is also described in reference to FIGS. 1-4 and can be implemented by the system 100 of FIG. 1.

At block 502, the workload compiler 124 analyzes source code files 126 of workload 128 to determine enterprise network connections between a plurality of subprograms 122 of the workload 128. At block 504, the workload compiler 124 generates a network flow graph 130 as interactions 409 between the subprograms 122 of the workload 128 in the enterprise network 101. At block 506, the network flow graph 130 is provided to the SDN controller 112 to make network resource allocations for the workload 128 based on the network flow graph 130.

Quality-of-service requirements may be provided in the network flow graph 130 on an end-to-end and per-link basis according to a service level agreement. Providing the quality-of-service requirements to the SDN controller 112 can assist in ensuring compliance with the service level agreement across the enterprise network 101. Upon setting up or modifying the network resource allocation by the SDN controller 112, a workload manager 120a of the enterprise server 102a may receive hints about the network resource allocation from the SDN controller 112. The workload manager 120a can adjust an allocation of compute resources 405 and/or network endpoints 407 to align with the network resource allocation to meet the service level agreement based on the hints.

Figure 6:
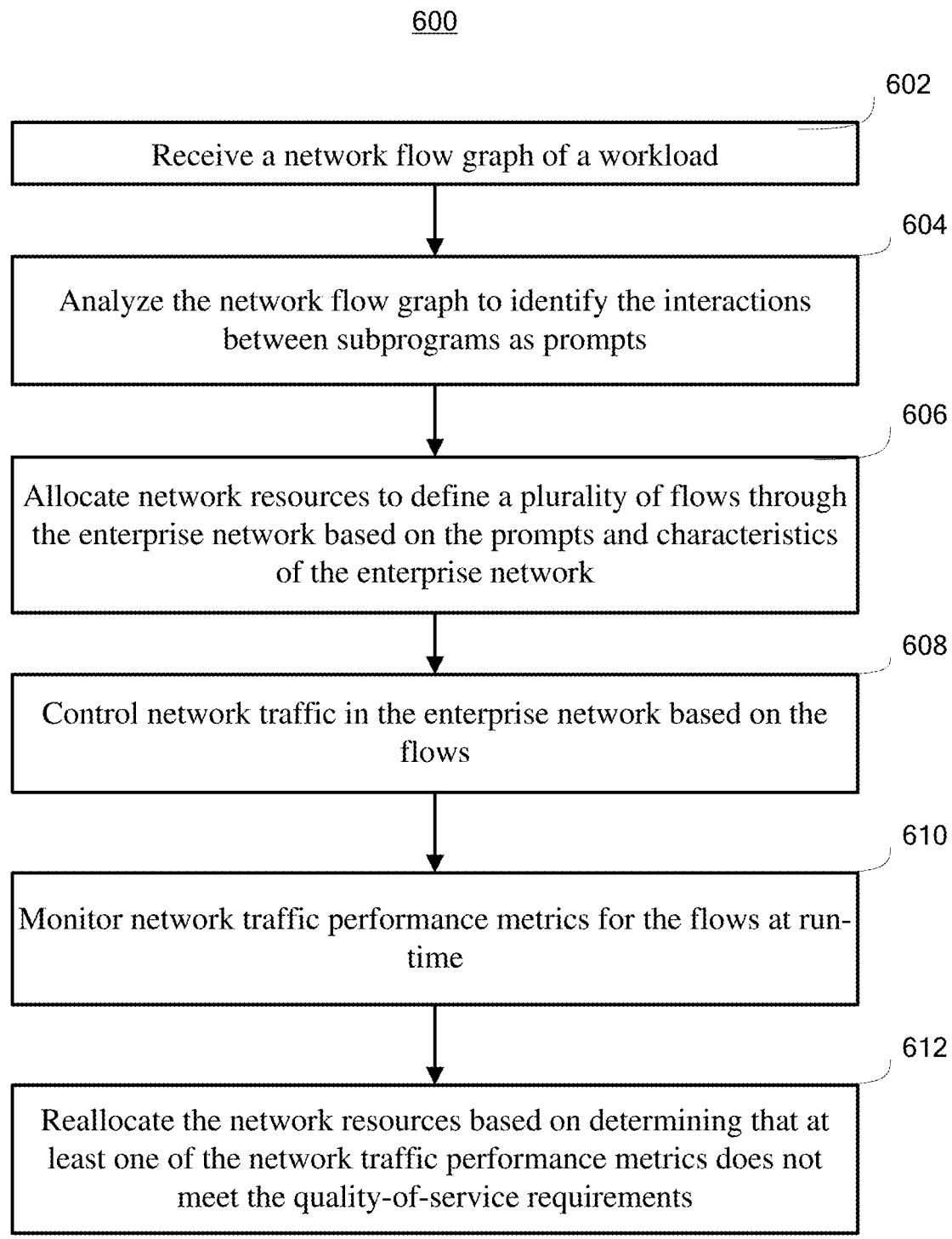
FIG. 6 depicts a process flow for an SDN controller to support SDN single-source enterprise workload management in accordance with an embodiment.

FIG. 6 depicts a process 600 for an SDN controller to support SDN single-source enterprise workload management as a computer-implemented method in accordance with an embodiment. The process 600 is also described in reference to FIGS. 1-4 and can be implemented by the system 100 of FIG. 1. At block 602, the SDN controller 112 in the enterprise network 101 receives a network flow graph 130 of a workload 128 from a workload compiler 124 of the enterprise network 101. The network flow graph 130 defines interactions 409 between a plurality of subprograms 122 distributed in the enterprise network 101 based on compile-time information of the workload 128. A copy of the network flow graph 130 may be saved as network flow graph 318 in memory 310 of the SDN controller 112.

At block 604, the SDN controller 112 analyzes the network flow graph 318 to identify the interactions 409 between the subprograms 122 as prompts. At block 606, the SDN controller 112 allocates network resources to define a plurality of flows through the enterprise network 101 based on the prompts and characteristics of the enterprise network 101. The characteristics of the enterprise network 101 may include quality-of-service requirements defined on an end-to-end and per-link basis. At block 608, the SDN controller 112 controls network traffic in the enterprise network 101 based on the flows.

At block 610, network traffic performance metrics can be monitored for the flows at run-time. Monitoring of network traffic may be performed locally at one or more network endpoints 407 and intermediate nodes 406 to determine the network traffic performance metrics, and the network traffic performance metrics are returned to the SDN controller 112.

At block 612, the network resources can be reallocated based on determining that at least one of the network traffic performance metrics does not meet the quality-of-service requirements. Reallocating the network resources may include remapping flows across a plurality of quality-of-service traffic classes. Quality-of-service traffic classes can be defined by different levels of performance in steps or stages ranging from relatively low to relatively high. Reallocating may alternatively or additionally include reallocating one or more network endpoints 407 of the flows on compute nodes 403 to apply additional network traffic processing to the flows based on determining that insufficient bandwidth has been allocated. Reallocating the network resources can also include allocating additional buffers at one or more nodes (e.g., buffers 208a-208n of a switch 106) based on determining that jitter requirements are not met by the current allocation.

The SDN controller 112 may also provide hints about network resource allocation to one or more workload managers 120, 120a at one or more network endpoints 407 to enable the one or more workload managers 120, 120a to allocate compute resources 405 to align with the network resource allocation to meet a service level agreement.

Technical effects and benefits include automated workload management in a software defined network using a software-defined networking single-source enterprise workload manager.

As will be appreciated by one of average skill in the art, aspects of embodiments may be embodied as a system, method or computer program product. Accordingly, aspects of embodiments may take the form of an entirely hardware embodiment, an entirely software embodiment (including firmware, resident software, micro-code, etc.) or an embodiment combining software and hardware aspects that may all generally be referred to herein as, for example, a "circuit," "module" or "system." Furthermore, aspects of embodiments may take the form of a computer program product embodied in one or more computer readable storage device(s) having computer readable program code embodied thereon.

One or more of the capabilities of embodiments can be implemented in software, firmware, hardware, or some combination thereof. Further, one or more of the capabilities can be emulated.

An embodiment may be a computer program product for enabling processor circuits to perform elements of the invention, the computer program product comprising a computer readable storage medium readable by a processing circuit and storing instructions for execution by the processing circuit for performing a method.

The computer readable storage medium (or media), being a tangible, non-transitory, storage medium having instructions recorded thereon for causing a processor circuit to perform a method. The "computer readable storage medium" being non-transitory at least because once the instructions are recorded on the medium, the recorded instructions can be subsequently read one or more times by the processor circuit at times that are independent of the time of recording. The "computer readable storage media" being non-transitory including devices that retain recorded information only while powered (volatile devices) and devices that retain recorded information independently of being powered (non-volatile devices). An example, non-exhaustive list of "non-transitory storage media" includes, but is not limited to, for example: a semi-conductor storage device comprising, for example, a memory array such as a RAM or a memory circuit such as latch having instructions recorded thereon; a mechanically encoded device such as punch-cards or raised structures in a groove having instructions recorded thereon; an optically readable device such as a CD or DVD having instructions recorded thereon; and a magnetic encoded device such as a magnetic tape or a magnetic disk having instructions recorded thereon.

A non-exhaustive list of examples of computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM). Program code can be distributed to respective computing/processing devices from an external computer or external storage device via a network, for example, the Internet, a local area network, wide area network and/or wireless network. The network may comprise copper transmission cables, optical transmission fibers, wireless transmission, routers, firewalls, switches, gateway computers and/or edge servers. A network adapter card or network interface card in each computing/processing device receives a program from the network and forwards the program for storage in a computer-readable storage device within the respective computing/processing device.

Computer program instructions for carrying out operations for aspects of embodiments may be for example assembler code, machine code, microcode or either source or object code written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable storage medium that can direct a computer, other programmable data processing apparatus, or other devices to function in a particular.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for software-defined networking (SDN) single-source enterprise workload management, the method comprising:

analyzing, by an enterprise server executing a workload compiler, a plurality of source code files of a workload during a workload compilation and build process to determine enterprise network connections between a plurality of subprograms of the workload as a plurality of compile-time information of the workload, the workload comprising a distributed application formed from the subprograms executing on a plurality of servers distributed across the enterprise network to implement portions of the distributed application;

generating, by the workload compiler, a network flow graph as interactions between the subprograms of the workload in the enterprise network responsive to the compile-time information of the workload;

providing the network flow graph to an SDN controller to make network resource allocations for the workload based on the network flow graph; and adjusting an allocation of compute resources, by a workload manager of the enterprise server, based on a notification of a reallocation of network resources made by the SDN controller, wherein the reallocation of network resources is performed predictively at an anticipated peak demand time based on one or more observed patterns in a plurality of network traffic performance metrics.

2. The method of claim 1, further comprising:

including quality-of-service requirements in the network flow graph on an end-to-end and per-link basis according to a service level agreement; and providing the quality-of-service requirements to the SDN controller to ensure compliance with the service level agreement across the enterprise network.

3. The method of claim 2, further comprising:

receiving, at a workload manager of the enterprise server, hints about the network resource allocation from the SDN controller; and adjusting the allocation of compute resources, by the workload manager, to align with the network resource allocation to meet the service level agreement based on the hints.

4. The method of claim 2, wherein the quality-of-service requirements comprise an end-to-end delay requirement, a bandwidth requirement, and a jitter requirement.

5. The method of claim 4, wherein adjusting the allocation of compute resources, by the workload manager, further comprises allocating one or more additional buffers at one or more of compute nodes of the enterprise network based on the SDN controller determining that the jitter requirement is not met by a current allocation.

6. The method of claim 1, wherein the network flow graph is provided to the SDN controller via a secure link.

7. The method of claim 1, wherein the reallocation of network resources comprises a modified allocation of one or more flows between two or more compute nodes through two or more links and through two or more switches in the enterprise network.

8. A system for software-defined networking (SDN) single-source enterprise workload management, the system comprising:

an SDN controller in an enterprise network; and an enterprise server comprising a workload compiler and a workload manager, the enterprise server configured to perform a method comprising:

analyzing, by the workload compiler, a plurality of source code files of a workload during a workload compilation and build process to determine enterprise network connections between a plurality of subprograms of the workload as a plurality of compile-time information of the workload, the workload comprising a distributed application formed from the subprograms executing on a plurality of servers distributed across the enterprise network to implement portions of the distributed application;

generating, by the workload compiler, a network flow graph as interactions between the subprograms of the workload in the enterprise network responsive to the compile-time information of the workload;

providing the network flow graph to the SDN controller to make network resource allocations for the workload based on the network flow graph; and adjusting an allocation of compute resources, by the workload manager, based on a notification of a reallocation of network resources made by the SDN controller, wherein the reallocation of network resources is performed predictively at an anticipated peak demand time based on one or more observed patterns in a plurality of network traffic performance metrics.

9. The system of claim 8, wherein the SDN controller is configured to perform a method comprising:

receiving the network flow graph at the SDN controller;

creating a local copy of the network flow graph within the SDN controller;

analyzing the local copy of the network flow graph to identify the interactions between the subprograms as prompts;

expanding the local copy of the network flow graph to include currently known characteristics of the enterprise network;

allocating network resources to define a plurality of flow tables for a plurality of flows through the enterprise network based on the prompts and the currently known characteristics of the enterprise network, wherein the flow tables are defined for a plurality of switches in the enterprise network and are deployed from the SDN controller to the switches;

controlling network traffic in the enterprise network based on the flows;

monitoring network traffic performance metrics for the flows at run-time; and reallocating the network resources based on determining that at least one of the network traffic performance metrics does not meet at least one of a plurality of quality-of-service requirements, wherein the reallocating comprises updating one or more of the flow tables.

10. The system of claim 8, wherein the enterprise server is further configured to perform:

including quality-of-service requirements in the network flow graph on an end-to-end and per-link basis according to a service level agreement; and providing the quality-of-service requirements to the SDN controller to ensure compliance with the service level agreement across the enterprise network.

11. The system of claim 10, wherein the enterprise server is further configured to perform:
receiving, at a workload manager of the enterprise server, hints about the network resource allocation from the SDN controller; and
adjusting the allocation of compute resources, by the workload manager, to align with the network resource allocation to meet the service level agreement based on the hints.

12. The system of claim 10, wherein the quality-of-service requirements comprise an end-to-end delay requirement, a bandwidth requirement, and a jitter requirement, and further wherein adjusting the allocation of compute resources, by the workload manager, further comprises allocating one or more additional buffers at one or more of compute nodes of the enterprise network based on the SDN controller determining that the jitter requirement is not met by a current allocation.

13. The system of claim 8, wherein the network flow graph is provided to the SDN controller via a secure link.

14. The system of claim 8, wherein the reallocation of network resources comprises a modified allocation of one or more flows between two or more compute nodes through two or more links and through two or more switches in the enterprise network.

15. A computer program product for software-defined networking (SDN) single-source enterprise workload management, the computer program product comprising:
a storage medium readable by a processing circuit and storing instructions for execution by the processing circuit for performing a method comprising:
analyzing, by an enterprise server executing a workload compiler, a plurality of source code files of a workload during a workload compilation and build process to determine enterprise network connections between a plurality of subprograms of the workload as a plurality of compile-time information of the workload, the workload comprising a distributed application formed from the subprograms executing on a plurality of servers distributed across the enterprise network to implement portions of the distributed application;
generating, by the workload compiler, a network flow graph as interactions between the subprograms of the workload in the enterprise network responsive to the compile-time information of the workload;
providing the network flow graph to an SDN controller to make network resource allocations for the workload based on the network flow graph; and
adjusting an allocation of compute resources, by a workload manager of the enterprise server, based on a notification of a reallocation of network resources made by the SDN controller, wherein the reallocation of network resources is performed predictively at an anticipated peak demand time based on one or more observed patterns in a plurality of network traffic performance metrics.

16. The computer program product of claim 15, wherein the instructions are further configured for performing the method comprising:
including quality-of-service requirements in the network flow graph on an end-to-end and per-link basis according to a service level agreement; and
providing the quality-of-service requirements to the SDN controller to ensure compliance with the service level agreement across the enterprise network.

17. The computer program product of claim 16, wherein the instructions are further configured for performing the method comprising:
receiving, at a workload manager of the enterprise server, hints about the network resource allocation from the SDN controller; and
adjusting the allocation of compute resources, by the workload manager, to align with the network resource allocation to meet the service level agreement based on the hints.

18. The computer program product of claim 16, wherein the quality-of-service requirements comprise an end-to-end delay requirement, a bandwidth requirement, and a jitter requirement.

19. The computer program product of claim 18, wherein adjusting the allocation of compute resources, by the workload manager, further comprises allocating one or more additional buffers at one or more of compute nodes of the enterprise network based on the SDN controller determining that the jitter requirement is not met by a current allocation.

20. The computer program product of claim 15, wherein the reallocation of network resources comprises a modified allocation of one or more flows between two or more compute nodes through two or more links and through two or more switches in the enterprise network.

* * * * *